United States Patent
Geng et al.

(10) Patent No.: US 8,048,566 B2
(45) Date of Patent: Nov. 1, 2011

(54) NICKEL HYDROXIDE ELECTRODE FOR RECHARGEABLE BATTERIES

(75) Inventors: Mingming Geng, San Diego, CA (US); Jeffrey Phillips, La Jolla, CA (US); Samaresh Mohanta, San Diego, CA (US)

(73) Assignee: Powergenix Systems, Inc., San Diego, CA (US)

( * ) Notice: Subject to any disclaimer, the term of this patent is extended or adjusted under 35 U.S.C. 154(b) by 280 days.

(21) Appl. No.: 12/432,639

(22) Filed: Apr. 29, 2009

(65) Prior Publication Data

US 2009/0208839 A1    Aug. 20, 2009

Related U.S. Application Data

(63) Continuation-in-part of application No. 12/365,658, filed on Feb. 4, 2009.

(60) Provisional application No. 61/065,079, filed on Feb. 7, 2008.

(51) Int. Cl.
| | |
|---|---|
| H01M 4/13 | (2010.01) |
| H01M 4/42 | (2006.01) |
| H01M 4/48 | (2010.01) |
| H01M 4/32 | (2006.01) |
| H01M 10/26 | (2006.01) |

(52) U.S. Cl. ......... 429/231; 429/229; 429/223; 429/206
(58) Field of Classification Search .................. None
See application file for complete search history.

(56) References Cited

U.S. PATENT DOCUMENTS

| | | | |
|---|---|---|---|
| 3,647,544 A | 3/1972 | Schneider | |
| 3,870,564 A | 3/1975 | Takamura et al. | |
| 3,951,687 A | 4/1976 | Takamura et al. | |
| 3,961,985 A | 6/1976 | Takamura et al. | |
| 4,003,754 A | 1/1977 | Winsel et al. | |
| 4,017,665 A | 4/1977 | Sandera et al. | |
| 5,215,836 A | 6/1993 | Eisenberg | |
| 5,523,182 A | 6/1996 | Ovshinsky et al. | |
| 5,804,334 A | 9/1998 | Yamamura | |
| 5,968,684 A | 10/1999 | Hayashi et al. | |
| 6,040,007 A * | 3/2000 | Junichi et al. | 427/215 |

(Continued)

FOREIGN PATENT DOCUMENTS

EP    0833397    4/1976
(Continued)

OTHER PUBLICATIONS

U.S. Appl. No. 10/899,593, filed Jul. 26, 2004.
(Continued)

*Primary Examiner* — Barbara Gilliam
*Assistant Examiner* — Angela Martin
(74) *Attorney, Agent, or Firm* — Weaver Austin Villeneuve & Sampson LLP

(57) ABSTRACT

The nickel hydroxide particles for a nickel hydroxide electrode may be treated using an alkaline solution of a strong oxidizing agent such as sodium or potassium persulfate to modify the surface nickel hydroxide structure. The resulting modified surface structure has been found to impart various benefits to electrodes formed from the nickel hydroxide. It is believed that the oxidation of cobalt compounds at the surface of the nickel hydroxide particles results in a highly conductive cobalt compound that plays an important role in the high reliability, high stability and high capacity utilization of nickel electrodes as described herein.

6 Claims, 9 Drawing Sheets

U.S. PATENT DOCUMENTS

| | | | |
|---|---|---|---|
| 6,225,004 | B1 | 5/2001 | Hayashi |
| 6,436,575 | B1 | 8/2002 | Weckesser et al. |
| 6,617,072 | B2 | 9/2003 | Venkatesan et al. |
| 6,649,305 | B1 | 11/2003 | Bugnet et al. |
| 6,787,265 | B2 | 9/2004 | Phillips |
| 7,261,972 | B2 | 8/2007 | Inada et al. |
| 7,829,221 | B2 | 11/2010 | Phillips |
| 2002/0037455 | A1 * | 3/2002 | Tani et al. .................. 429/223 |
| 2002/0172758 | A1 | 11/2002 | Nanno et al. |
| 2003/0140483 | A1 | 7/2003 | Wakabayashi et al. |
| 2004/0115533 | A1 | 6/2004 | Phillips |
| 2005/0003270 | A1 | 1/2005 | Phillips |
| 2006/0029863 | A1 | 2/2006 | Miyamoto et al. |
| 2009/0202904 | A1 | 8/2009 | Geng et al. |

FOREIGN PATENT DOCUMENTS

| | | |
|---|---|---|
| EP | 0457354 | 11/1991 |
| EP | 0697746 | 2/1996 |
| EP | 0 902 490 | 3/1999 |
| EP | 1 172 869 | 1/2002 |
| EP | 1207576 | 5/2002 |
| EP | 1 367 666 | 12/2003 |
| EP | 1 699 099 | 9/2006 |
| EP | 902490 B1 * | 11/2008 |
| EP | 1168471 | 1/2011 |
| JP | 54163324 | 12/1979 |
| JP | 56-29345 | 7/1981 |
| JP | 07037609 | 2/1995 |
| JP | 11297352 | 10/1999 |
| JP | 200058062 | 2/2000 |
| JP | 2005 056 733 | 3/2005 |

OTHER PUBLICATIONS

Search Report and Written Opinion dated May 13, 2009 for corresponding PCT Application No. PCT/US2009/033265.

Ying et al., "Surface modification of nickel hydroxide particles by micro-sized cobalt oxide hydroxide and properties as electrode materials," *Surface and Coatings Technology*, Elsevier, Amsterdam, NL, vol. 200, No. 7, (Dec. 21, 2005), pp. 2376-2379, XP005181204.

CA Office Action dated Apr. 14, 2009, from CA Appl. No. 2,325,640.

EP Office Action dated Dec. 2, 2009, from EP Appl. No. 01993957.8.

JP Office Action dated Sep. 8, 2009, from JP Appl. No. 2002-541747, with English explanation from Japanese Associate of Office Action.

US Notice of Allowance dated Nov. 19, 2009, from related U.S. Appl. No. 10/899,593.

US Notice of Allowance dated Feb. 2, 2009, from related U.S. Appl. No. 10/899,593.

Search Report and Written Opinion dated Jun. 22, 2010 for PCT Application No. PCT/US2010/033023.

US Notice of Allowance dated Jun. 14, 2010, from related U.S. Appl. No. 10/899,593.

US Notice of Allowance dated Sep. 23, 2010, from related U.S. Appl. No. 10/899,593.

Ohta et al., "Nicel Hydroxide Electrode: Improvement of Charge Efficiency at High Temperature," The Electrochemical Society Proceedings, vol. 94-27, pp. 296-302, 1994.

Canada Office Action dated Apr. 30, 2008, from corresponding Canadian Patent Application No. 2,325,640.

International Search Report mailed Apr. 29, 2002, PCT Application PCT/UCA01/01717.

Japan Office Action dated Feb. 22, 2008, from corresponding Japan Patent Application No. 2002-541747, with English explanation from Japanese Associate of Office Action.

Japan Abstract, dated Feb. 25, 2000, from Japan Patent Application No. 2002-058062.

Office Action dated Dec. 10, 2007 for U.S. Appl. No. 10/899,593.

Final Office Action dated Apr. 11, 2008 for U.S. Appl. No. 10/899,593.

Office Action dated Jun. 30, 2008 for U.S. Appl. No. 10/899,593.

"WordNet Search." WordNet. Dec. 3, 2008. <http://wordnet.princeton.edu/perl/webwn?s=embedded>.

"WordNet Search." WordNet. Dec. 3, 2008. <http://wordnet.princeton.edu/perl/webwn?s=paste>.

"WordNet Search." WordNet. Apr. 4, 2008. <http://wordnet.princeton.edu>.

Office Action dated Dec. 4, 2008 for U.S. Appl. No. 10/899,593.

Office Action dated Mar. 6, 2009 for U.S. Appl. No. 10/899,593.

US Non-Final Office Action dated Mar. 31, 2011, from related U.S. Appl. No. 12/365,658.

* cited by examiner

NICKEL HYDROXIDE ELECTRODE FOR RECHARGEABLE BATTERIES

CROSS-REFERENCE TO RELATED APPLICATIONS

This application is a continuation in part of U.S. patent application Ser. No. 12/365,658 filed Feb. 4, 2009, and naming Mingming Geng et al. as inventors, which in turn claims benefit under U.S.C. §119(e) to provisional application 61/065,079, filed on Feb. 7, 2008, the disclosures of which are incorporated herein in their entireties for all purposes.

BACKGROUND

This invention pertains generally to nickel-zinc batteries. More specifically, this invention pertains to compositions and manufacturing methods for positive nickel electrodes.

Recent economic trends have unmistakably indicated a need for high power and high energy density rechargeable batteries, particularly for applications such as electric vehicles and power tools. Certain aqueous batteries employing a nickel hydroxide electrode may provide suitably high energy density and even high power to meet this need. The nickel hydroxide electrode has been used as the positive electrode in nickel-metal hydride batteries, nickel-cadmium batteries and nickel-zinc batteries. The electrode typically includes nickel hydroxide (including its oxidized form nickel oxyhydroxide), nickel powder and binding materials. Cobalt metal and/or a cobalt compound may be included to increase the conductivity of the nickel electrode. Unfortunately, cobalt can under certain conditions move to the negative electrode where it can promote hydrogen evolution and related difficulties, particularly in the high power nickel-zinc battery.

As demands for higher power and energy density escalate, the composition and associated manufacturing methods of nickel hydroxide electrodes become ever more critical to performance.

SUMMARY OF THE INVENTION

In certain embodiments, a nickel hydroxide electrode contains nickel hydroxide particles, cobalt or a cobalt compound, and nickel powder. The nickel hydroxide particles may contain some cobalt oxide and/or hydroxide with the cobalt present in one or more valences (II and/or III). In some cases, the nickel hydroxide particles are coated with a thin layer of the cobalt oxide and/or hydroxide. They may also include some amount of zinc oxide. In certain embodiments described herein, the surface layer of the nickel hydroxide particles (with or without a cobalt compound present) is treated using an alkaline solution of a strong oxidizing agent such as sodium or potassium persulfate to modify the surface nickel hydroxide structure. The resulting modified surface structure has been found to impart various benefits to electrodes formed from the nickel hydroxide. It is believed that the modified surface structure facilitates an interfacial reaction between the nickel hydroxide and cobalt metal and/or cobalt compounds in the positive electrode to inhibit cobalt from leaving the positive electrode during contact with electrolyte. In this regard, it may inhibit cobalt (and zinc) compounds in the nickel hydroxide particles from dissolving into the alkaline battery electrolyte at high temperature. Further, it is believed that the oxidation of cobalt compounds at the surface of the nickel hydroxide particles results in a highly conductive cobalt compound that plays an important role in high reliability, high stability and high capacity utilization of nickel electrodes as described herein.

The positive electrodes described herein show minimal dissolution of cobalt during cell fabrication, soaking, and cycling. In rechargeable nickel-zinc batteries reduced cobalt migration from the positive electrode to the zinc electrode results in a significant reduction in self-discharge and therefore improved reliability. Nickel-zinc batteries using this invention also show markedly improved capacity retention as they are cycled.

Certain aspects of the invention provide methods of making a positive electrode for a battery, which methods may be characterized by the following operations: (a) mixing a hydroxide solution and a strong oxidizing agent with nickel hydroxide at a temperature of at least about 90° C. to produce a modified nickel hydroxide; (b) separating the modified nickel hydroxide from a mixture resulting from (a); (c) preparing an electrode mixture comprising the modified nickel hydroxide; and (d) incorporating the electrode mixture into a positive electrode. In certain embodiments, the strong oxidizing agent is a permanganate, a perchlorate, a persulfate, and/or ozone. In certain embodiments, operation (a) is performed at a temperature of about 90° C. to about 150° C., and in some cases it is performed for a period of between about 5 minutes and 200 minutes.

In some cases, the nickel hydroxide is a powder comprising nickel hydroxide particles coated with a cobalt compound such as cobalt oxide, cobalt hydroxide, and/or cobalt oxyhydroxide. The cobalt compound may comprise up to about 1 weight percent of the nickel hydroxide powder. Such cobalt coated particles may be prepared by mixing the nickel hydroxide with an alkali metal hydroxide and a cobalt salt solution. The coating may be performed at a temperature of between about 40° C. and about 60° C.

The separation process may involve (a) washing the modified nickel hydroxide; and (b) drying the modified nickel hydroxide. In some embodiments, the separation involves (a) filtering the modified nickel hydroxide; and (b) washing the filtered modified nickel hydroxide.

The positive electrode resulting from the above process may, in various embodiments, contain between about 60 to 95% by weight of the modified nickel hydroxide and up to about 10% of cobalt metal and/or a cobalt compound. In a specific example, the cobalt compound is cobalt oxide, cobalt hydroxide, cobalt oxyhydroxide, or a combination thereof.

Another aspect of the invention pertains to a galvanic cell characterized by the following elements: (a) a negative electrode; (b) a nickel hydroxide positive electrode; (c) a separator disposed between the positive electrode and the negative electrode and preventing electrical contact therebetween; and (d) an electrolyte in contact with the negative electrode, the positive electrode and the separator. The nickel hydroxide positive electrode may contain (i) nickel hydroxide particles having a modified surface comprising nickel in a higher oxidation state on average than is present in the bulk of the particles, and (ii) cobalt metal and/or a cobalt compound. In various embodiments, the cobalt compound is cobalt oxide, cobalt hydroxide, and/or cobalt oxyhydroxide. In some cases, the nickel hydroxide particles have a coating of a cobalt compound, with at least about 90% by weight of the cobalt compound in the coating being highly oxidized cobalt.

In some embodiments, the nickel hydroxide positive electrode contains about 60 to 95 weight percent nickel hydroxide particles having a modified surface. The cobalt metal and/or cobalt compound may be present in the positive electrode at levels up to about 10 weight percent, each. In further embodiments, the positive electrode includes one or more of the following: nickel metal powder, $Y_2O_3$, $Ca(OH)_2$, and a binder.

In some preferred implementations, the negative electrode is zinc oxide negative electrode, and the resulting cell may achieve a cycle life of at least about 500 cycles at a discharge rates of about 5 C or greater. Preferably, the zinc oxide negative electrode contains less than about 10 ppm cobalt. This low level of cobalt may be achieved using the modified positive electrodes described herein. In some cases, the positive electrode may be characterized by having a cobalt compound that is not significantly soluble in the electrolyte at room temperature, with the electrolyte being an alkaline electrolyte.

These and other features and advantages are discussed further below with reference to associated drawings.

DETAILED DESCRIPTION OF THE PRESENT INVENTION

Figure 1:
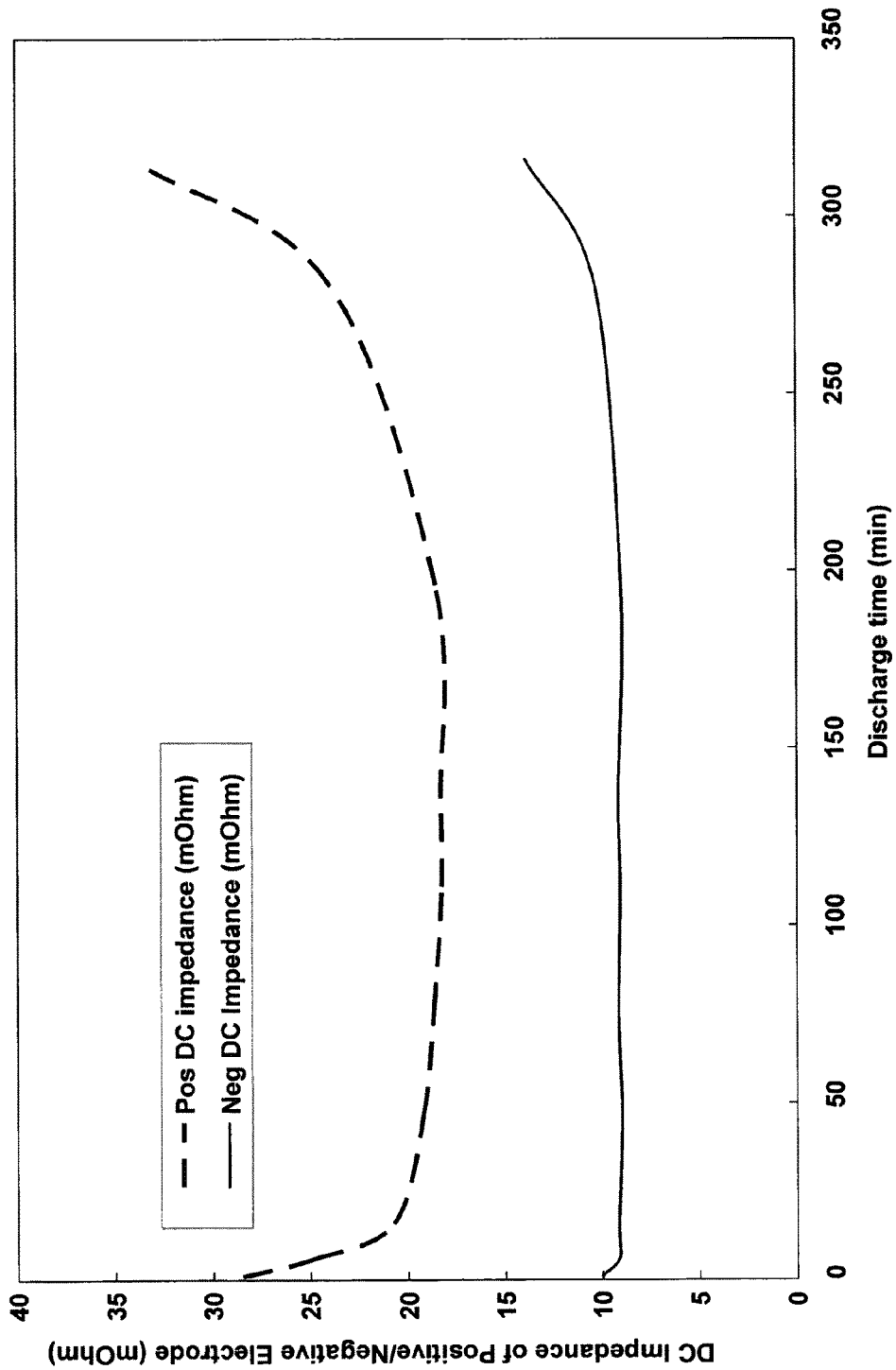
FIG. 1 is a charge efficiency plot depicting the mismatch in charge efficiency for zinc and nickel hydroxide electrodes observed in typical nickel-zinc cells.

Embodiments of the present invention described herein concern a positive nickel electrode for certain types of nickel containing battery cells. Those of skill in the art will understand that the following detailed description is illustrative and not limiting in the range of applications for the disclosed positive electrode. For example, the electrode may be used in various battery chemistries including nickel-zinc, nickel-cadmium and nickel-metal hydride.

Introduction

In various embodiments, the positive electrode includes nickel hydroxide particles having a highly oxidized surface. Such surface may be produced by treating nickel hydroxide particles with a strong oxidizing agent. Rechargeable cells produced using positive electrodes having the nickel hydroxide particles as described herein have been found to possess one or more of the following characteristics: long shelf life, long cycle life at moderate to high capacity, low impedance, high power density, and suitability for high rate applications.

Some conventional positive nickel electrodes include cobalt as cobalt metal and/or cobalt oxide. The cobalt serves as part of the conductive matrix responsible for maintaining low electrode and cell impedance. Specifically, cobalt oxyhydroxide at the surface of the nickel hydroxide particles provides a conductive network that improves electrode utilization and rate capability. It has been appreciated that dissolved cobalt may travel from the positive electrode before or during the first charge or formation process of the electrochemical cell. Not only does such movement of cobalt represent a loss of useful material from the positive electrode, and associated expense and/or increased impedance, but it can interfere with the performance of other cell components such as the negative electrode.

One cell type where the impact of cobalt movement from the positive to negative electrode can be especially pronounced is the nickel-zinc cell. The nickel-zinc battery provides a high energy density and high power alternative to nickel cadmium batteries. This cell has been promoted as an ideal replacement for nickel cadmium batteries. It is environmentally friendly and has superior performance to the nickel-cadmium battery and also has the capability of being manufactured on the same manufacturing lines.

The rechargeable zinc electrode has historically had problems of zinc dendritic growth, zinc electrode shape change, and zinc electrode swelling, all of which have limited the number of charge-discharge cycles. Recent developments have shown cycle life competitive with the best nickel-cadmium and nickel metal hydride technologies; e.g., over 1000 high rate discharge-charge cycles being achieved in a sealed cylindrical format.

The effects of soluble cobalt species can have a particularly detrimental effect on this type of battery. The migration of soluble cobalt species from the positive electrode to the negative zinc electrode reduces the amount of cobalt in the positive electrode, thereby degrading the conductive matrix. The reduction in the conductive matrix results in higher impedance for the battery. The migration of cobalt out of the positive electrode also results in incorporation of cobalt in the zinc electrode, where it can accelerate the rate of hydrogen evolution during both the operation and the storage of the battery. This can result in cell imbalance in multi-cell batteries and may promote the occurrence of dendritic shorts that can result in premature failures.

The high 1.74V open circuit voltage of the nickel-zinc electrochemical cell is partially responsible for the hydrogen evolution issue. Of course, it provides a significant advantage of the technology. It allows a size reduction in high voltage battery packs since fewer cells are required to meet a given voltage requirement. The high open circuit voltage is a consequence of the negative redox potential of the zinc electrode, but unfortunately operating at this potential increases the likelihood that electrode corrosion will generate hydrogen. Thus, the successful operation of the zinc negative electrode depends on eliminating contaminants such as cobalt that can promote hydrogen evolution. When a cell is fabricated, the negative and positive electrodes come in contact with the electrolyte prior to any charging or discharging. During this initial "soak" stage, which may last for a period of hours, some cobalt species from the positive electrode may dissolve in the electrolyte and thereby contaminate the negative electrode. During the first "forming" charge the cobalt metal or cobalt compounds in the positive nickel hydroxide convert to conductive cobalt oxyhydroxide, which is relatively insoluble in alkaline electrolyte. The cobalt oxidehydroxide promotes charging efficiency by lowering the voltage at which the positive electrode charges and thereby reduces the amount of oxygen evolution and possibly other parasitic reactions that can occur during charge. Unfortunately, during over-discharge, the cobalt oxyhydroxide can reduce to cobalt hydroxide, which may dissolve in the electrolyte and enter the zinc electrode. The compositions and fabrication methods described herein reduce the tendency for the cobalt in the positive electrode to dissolve. Thus, the present invention improves charging efficiency, capacity, and cycling performance.

It should be noted that alkaline electrolytes have been developed to minimize the zinc dendritic growth but their effectiveness may be reduced by cobalt contamination in the zinc electrode. Certain of these alkaline electrolytes are disclosed in U.S. Patent Publication US20060127761, titled "Electrolyte Composition For Nickel-Zinc Batteries" by Jeffrey Phillips, which is incorporated herein by reference for its disclosure of various electrolyte formulations suitable for use with this invention. Other useful cell design features are described in U.S. Patent Publication 2006-0207084, titled "Method of Manufacturing Nickel Zinc Batteries" by Jeffrey Phillips et al. (Ser. No. 11/367,028, filed Mar. 1, 2006) and U.S. Patent Publication 2006-0240317A1 titled "Nickel Zinc Battery Design" by Jeffrey Phillips et al. (Ser. No. 11/116,113, filed Apr. 26, 2005), both incorporated herein by reference for their disclosure of cell features that reduce the impact of zinc dendrite formation.

The charging process for a nickel hydroxide in an alkaline cell is shown as follows:

$$Ni(OH)_2 + OH^- \Leftrightarrow NiOOH + H_2O + e^- \quad (1)$$

The charging efficiency or utilization of the positive nickel electrode is affected by the oxygen evolution process which is controlled by the reaction:

$$4OH^- \rightarrow 2H_2O + O_2 + 4e^- \quad (2)$$

During the charging process, a portion of the current applied to the electrochemical cell for the purpose of charging process is instead consumed by a parasitic oxygen evolution reaction. This oxygen evolution reaction generally begins when the electrochemical cell is approximately 50-75% charged and accounts for an increasing portion of the charge current as the cell approaches full charge The charge efficiency of the nickel electrode also decreases with an increase in the temperature resulting in more oxygen evolution at higher temperatures.

The charge efficiency of the nickel electrode and the cycling capability are dependant on the integrity of the conducting cobalt film and the prevention of nickel hydroxide particle cracking during the expansion and contraction that occurs during charge and discharge. Both factors are influenced by the nature of the interaction of the surface nickel hydroxide and cobalt coating layers.

In the rechargeable zinc negative electrode, the starting electrochemically active material is the zinc oxide powder or a mixture of zinc and zinc oxide powder. The zinc oxide dissolves in the alkaline electrolyte to form the zincate (Zn(OH)$_4^{2-}$) that is reduced to zinc metal during the charging process. The zincate reaction at the zinc electrode is shown as follows:

$$ZnO + 2OH^- + H_2O \rightarrow Zn(OH)_4^{2-} \quad (3)$$

and the charging reaction can be written as follows:

$$Zn(OH)_4^{2-} + 2e^- \rightarrow Zn + 4OH^- \quad (4)$$

Then, the overall nickel-zinc battery reaction can be expressed as follows:

$$Zn + 2NiOOH + H_2O = ZnO + 2Ni(OH)_2 \quad (5)$$

Overcharge of a nickel-zinc battery results in the overcharge of the nickel hydroxide electrode since in normal designs the zinc electrode is present in coulometric excess. The excess zinc is present so that internally generated oxygen will be easily consumed at the zinc electrode. Any internal gas pressure within the nickel-zinc battery can usually be attributed to a build up of hydrogen generated during zinc corrosion as a result of slow recombination at the positive electrode. Excess generation of oxygen at the positive electrode or hydrogen at the negative electrode are both potentially damaging to the cell. Excessive local recombination of oxygen and rapid corrosion can isolate active zinc material, solubilize zinc and disrupt the electrochemical balance of the cell. The zinc corrosion reaction in the alkaline electrolyte can be written as follows:

$$2Zn + 2KOH + 2H_2O \rightarrow K_2Zn(OH)_4 + H_2 \quad (6)$$

During the battery charging process, the oxygen evolution at the nickel hydroxide electrode also accelerates the zinc corrosion. In this case, the zinc corrosion reaction can be represented as follows:

$$2Zn + 4KOH + 2H_2O + O_2 \rightarrow 2K_2Zn(OH)_4 \quad (7)$$

Thus oxygen production in the positive electrode of the nickel-zinc battery can enhance local zinc dissolution. While a corresponding reduction of the zincate is ongoing at the negative electrode during the charge process the two processes can occur at different locations.

A sealed nickel-zinc cell for commercial use should develop minimum internal pressure such that the cell should not vent except under extreme abuse. Storage under extreme temperatures (e.g., 60° C.) for a month or longer should not build up excessive internal pressure and result in the opening of the safety vent. A good design of the nickel hydroxide electrode can consume the battery internal hydrogen and minimize internal pressure. Sodium (or potassium) persulfate treatment of the cobalt-coated nickel hydroxide electrode can effectively decrease the battery gassing.

In the nickel-zinc batteries, the zinc electrode has superior conductivity and less activation polarization compared to the nickel hydroxide electrode. FIG. 1 shows the typical battery electrode internal DC resistance as a function of the Sub C battery state of charge at a 0.2 C discharge current (0.5 C pulse current for 5 seconds). As shown, the value of DC resistance of the positive nickel hydroxide electrode approximately doubles over the discharge. At the end of the discharge, the DC resistance of the positive electrode increases rapidly particularly in comparison to the negative electrode. Thus the high-rate charge and discharge capabilities of the nickel-zinc battery are mainly determined by the performance and conductivity of the nickel electrode. As a consequence, many commercial applications employing nickel-metal hydroxide cannot be charged or discharged to a point near full capacity. To do so would dramatically compromise cycle life.

In certain embodiments described herein, the surface structure and composition modifications of the nickel hydroxide or cobalt-coated nickel hydroxide particles allow improvements in the high-rate charge and discharge capabilities of the nickel hydroxide electrode. Specifically, the cells described herein may allow high charge acceptance. Further, in some embodiments, the cells described herein can be operated at a higher level of utilization than prior art cells employing comparable nickel hydroxide electrodes. In this respect the invention can have particular relevance to the use of the invention in hybrid and plug in hybrid electric vehicle power sources that require very high charge input and output.

In accordance with certain embodiments, nickel-zinc cells described herein provide improved cycle life and electrical performance in service. For example, the cells exhibit higher battery discharge voltage, higher discharge capacity, lower internal resistance, and high-rate discharge capability. In some embodiments, the disclosed cells have a long cycle lifetime (at least about 250 cycles) at high-rate discharge current, such as about 15 C discharge current. One way this improved performance is realized is through reduced cobalt solubility in the lattice of the nickel hydroxide particles when such particles are exposed to a potassium hydroxide alkaline electrolyte, even at elevated temperatures. Another direct benefit realized by certain embodiments is reduced zinc corrosion and lower battery gassing capability. In some cases, the cells described herein possess improved tolerance to overcharge conditions.

Nickel Hydroxide Particles

As indicated, positive electrodes described herein employ nickel hydroxide particles having a specified surface condition. Generally such particles comprise primarily nickel hydroxide, but depending upon the source and fabrication procedure, they may also contain limited amounts of other nickel compounds such as nickel oxyhydroxide and nickel oxide. Nickel materials used as starting materials for the processes described herein may contain any amounts of nickel hydroxide, nickel oxyhydroxide, nickel oxide, and the like. Frequently the starting material contains primarily nickel hydroxide with only small amounts of other nickel compounds, e.g., less than about 5% by weight and more typically less than about 1% by weight. Such materials that include primarily nickel hydroxide, but with small amounts of other nickel compounds such as oxides and oxyhydroxides, will be referred to herein as nickel hydroxide or nickel hydroxide particles.

The nickel hydroxide or similar compounds modified as described herein may contain about 3 to 10% by weight of the total weigh of the modified composition, depending on the treatment. Generally, the modified material is located at the surface of the nickel hydroxide particles. Of course, during normal cell operation, nickel hydroxide is converted to nickel oxyhydroxide during charge and the oxyhydroxide is converted to the hydroxide during discharge, and the present invention covers nickel hydroxide electrodes in various states of charge. Unless otherwise qualified, the electrode concentrations recited herein are those existing at the time the electrode is fabricated.

In certain embodiments, the nickel hydroxide starting material includes limited amounts of non-nickel compounds such as cobalt oxides or hydroxides and/or zinc oxides or hydroxides. In a specific embodiment, the nickel hydroxide material used in electrodes described herein contains between about 0 and 5% zinc compound by weight in the lattice, and more specifically between about 3 and 4% zinc compound by weight (e.g., about 3.5 weight percent). Further, in a specific embodiment, the nickel hydroxide material contains between about 0 and 5% cobalt compound by weight in the lattice, and more specifically between about 1 and 3% cobalt compound by weight (e.g., about 2 weight % cobalt).

In some embodiments, the nickel hydroxide particles of the starting material are coated with cobalt oxide or cobalt hydroxide. Such coatings are provided in addition to the embedded or entrained cobalt compounds described above. While such coatings may provide benefits in various embodiments, in some cases they should be present in only limited amounts to ensure the underlying nickel hydroxide matrix is effectively oxidized by a treatment as described herein. In some examples, the cobalt compound coating is provided at an average thickness of not greater than about 1 micrometer, more typically between about 0.1 and 0.7 micrometers. Further, the cobalt compound coating may be present in the particles in an amount of about 0.01 to 3% by weight, or more specifically between about 0.1 and 1% by weight. In one example, the cobalt compound coating is cobalt oxyhydroxide present in an amount of about 0.5% by weight.

Nickel hydroxide particles coated with cobalt compounds (as well as uncoated particles) may be obtained from various commercial vendors such as Changsha Research Institute (CRI) (P. R. China) and Kelong Power Sources Co. Ltd. (P. R. China). A cobalt oxide or hydroxide coating may be applied by various techniques such as the chemical reaction of a cobalt salt such as cobalt sulfate and an, alkali metal hydroxide with nickel hydroxide powder, or the reaction of dissolved cobalt ion ($Co(OH)_4^{2-}$) in an alkali metal hydroxide aqueous solution at the surface of the nickel hydroxide particle. In one embodiment further described herein a thin layer of cobalt compound is coated on nickel hydroxide particles by contacting such particles with an alkaline solution of an appropriate cobalt compound such as cobalt sulfate.

In certain embodiments, at least some of the zinc oxide and cobalt oxide are provided with the nickel hydroxide in a chemical mixture, whereby individual particles contain nickel hydroxide along with zinc oxide and cobalt oxide. Such premixed materials may be prepared by co-precipitation of the individual components or may be acquired in a commercially available formula from commonly known vendors such as International Nickel Corporation, and Tanaka. These materials resist leaching of the cobalt oxide and zinc oxide by locking the oxides into the insoluble nickel hydroxide matrix. Co-precipitation also apparently helps charge transfer efficiency by creating conductive channels through the positive electrode materials. In a preferred embodiment, the zinc oxide and cobalt oxide are each present in the co-precipitated material in concentrations of about 2-3% by weight for the zinc and 2-6% for the cobalt oxide. Other materials may be used in place of (or in addition to) cobalt oxide. These include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). Any of which may be provided as chemically homogeneous components or may be co-precipitated with nickel hydroxide or otherwise locked in a nickel hydroxide matrix.

The nickel hydroxide particles may be provided in various forms such as powders, granules, etc. In certain embodiments, the nickel hydroxide particles employed with this invention have an average size (diameter or longest dimension) of about 0.1 µm to 20 µm, and in a specific embodiment, between about 0.5 µm and 12 µm.

Regardless of whether the nickel hydroxide particles are coated or uncoated with a cobalt compound, their surfaces have a chemical and/or physical state that is distinct from conventional or commercial nickel hydroxide, which may be present in the interiors of the particles. This distinct state will be referred to herein as "modified." While this state will typically be limited to the surface regions of the nickel hydroxide particles, this need not be the case, and in certain embodiments, the state exists well into the particle interior and in some cases throughout the entire particle. 6342t35

The "modified" surface state is characterized by one or more of the following features: a higher oxidation state at the surface layer of the nickel hydroxide particles, an increase in the particles' dry weight of, e.g., up to about 3 weight % (often between about 1 to 3 weight %), a change in nickel hydroxide lattice morphology at the surface, and inclusion of alkali metal ions in the outer matrix. The higher oxidation state is achieved in comparison with that of the starting material. For example, if the starting material is entirely nickel (II) hydroxide, the resulting modified material will have, on average, an oxidation state that is greater than 2. In certain embodiments, the oxidation state of the modified outer region is, on average, greater than about 2.1, and in further embodiments greater than about 3. In some cases, it is between about 3 and 3.25. The weight increase is based on a difference in dry weights of the starting product and the final product. The alkali metal ions may result from the cations used in the oxidizing agent and/or the alkali metal hydroxide used to treat the particles as described below. In addition, the nickel hydroxide particles have a black color, which remains stable over an extended period, e.g., a period of months or longer. Examples of suitable processes for producing such modified state on the surface of nickel hydroxide particles are described below. To the extent that the nickel compound particles are coated with a cobalt compound, the cobalt compound may, like the nickel, exist in a highly oxidized state, e.g., greater than about 3 and sometimes in the range of about 3 to 3.25.

The modified nickel hydroxide or cobalt hydroxide appears to inhibit cobalt and zinc in the nickel hydroxide lattice from dissolving into the alkaline electrolyte. This was demonstrated by using an unformed pasted nickel electrode with 4 weight % cobalt powder addition. The material was immersed in 30 weight percent potassium hydroxide for one month at room temperature without visual evidence of cobalt in the potassium hydroxide electrolyte. Without treatment (or with less aggressive treatment), a bluish color to the electrolyte indicates the presence of cobalt ions. The cobalt compound at the surface of the nickel hydroxide has been oxidized and the layer structure of nickel hydroxide at the surface of the nickel hydroxide particles is believed to be significantly transformed into a modified state. In some cases, the modified nickel hydroxide may contain nickel oxyhydroxide. In some embodiments, the modifying process shrinks the nickel hydroxide particles.

The Nickel Hydroxide Modification Process

Nickel hydroxide particles, with or without a thin coating of cobalt compound, are treated with a strong oxidizing agent under alkaline conditions and at high temperature. This produces a modified and disordered surface of the nickel hydroxide particles as described above. The high temperature treatment is performed at between about 90 and 150° C., and in more specific embodiments between about 100 and 130° C., and in some embodiments between about 120 and 125° C. The hydroxide concentration levels are between about 5% and 30% by weight, and in more specific embodiments between about 10% and 15% by weight. The strong oxidizing agent is an inorganic or organic reagent such as an aqueous solution of a persulfate or permanganate salt. The treatment with a strong oxidation agent at high temperature produces a surface structure and oxidation state change at the surface layer of the nickel hydroxide particles. In certain embodiments, as indicated above, the treatment of the nickel hydroxide particles results in an increase in the material's weight of up to about 3 weight % (e.g., about 1 to 3 weight %) of dry particles. It is believed that the nickel hydroxide lattice morphology is altered and/or there is alkali metal ions present in the outer matrix.

In certain specific embodiments, mixing continues for about 5 to 200 minutes hours at between 100 and 150 degrees Centigrade. Mixing can be accomplished by stirring or other suitable process. After the reaction is complete, it may be necessary to separate the oxidized particles from the liquid solution. Such separation may include multiple steps. In one embodiment, the reaction products are initially washed with distilled water. The excess water may be decanted from the mixing vessel. The resulting nickel hydroxide may be further dried before use in the actual positive electrode paste operation. In another embodiment, the mixture may be filtered first before it is washed with distilled water or another suitable washing solution.

Figure 2:
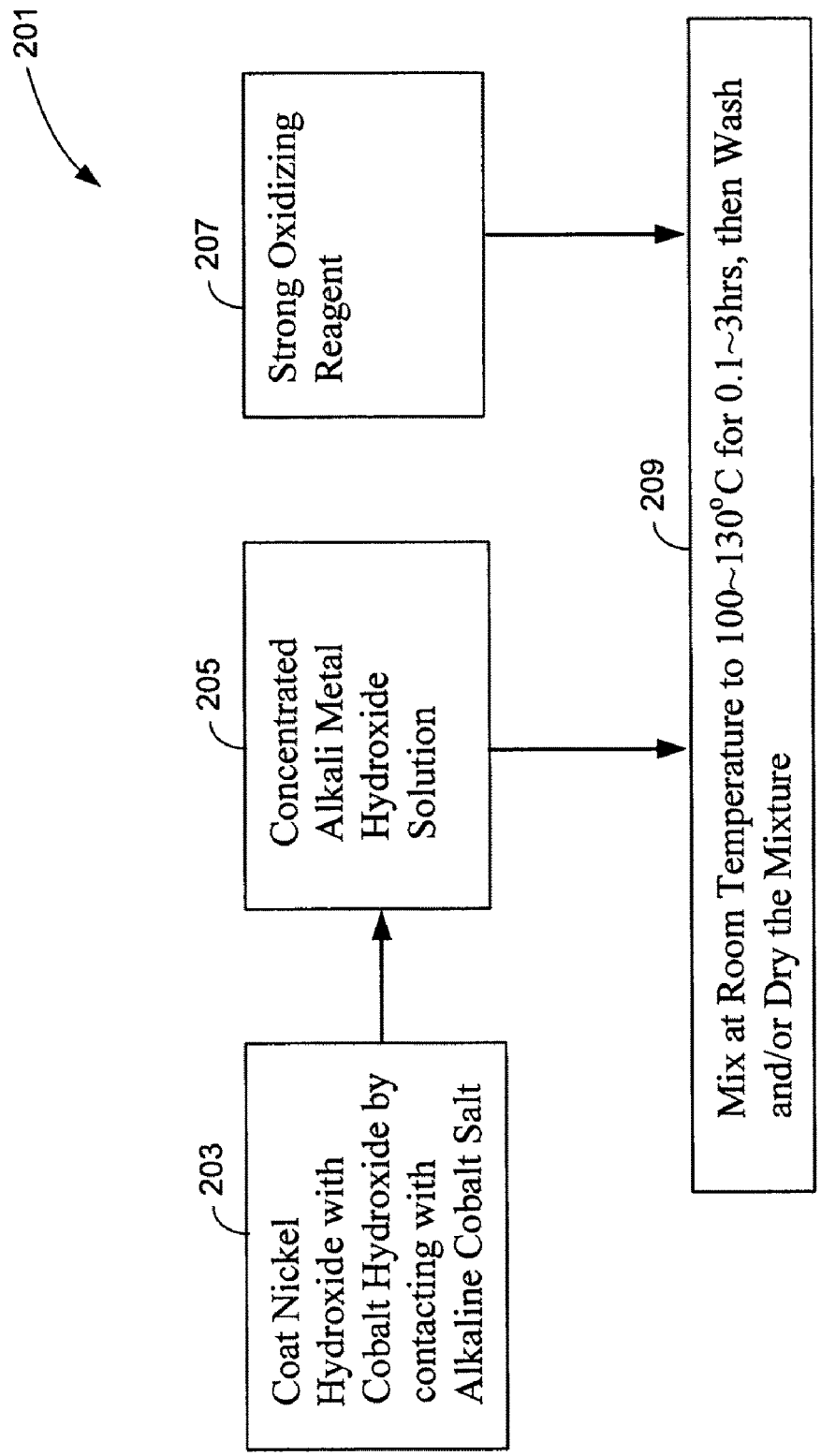
FIG. 2 is a flow diagram of a nickel hydroxide stabilization process according to various embodiments.

In accordance with certain embodiments, nickel hydroxide or cobalt-coated nickel hydroxide may be treated according to a general process 201 shown in FIG. 2. Initially, in an optional process operation 203, nickel hydroxide particles are coated with a thin layer of cobalt oxide other cobalt compound. In some embodiments, pre-coated nickel hydroxide particles will be available, and operation 203 will be unnecessary. In other cases, the nickel hydroxide modifying process will be performed on uncoated nickel hydroxide particles, in which case operation 203 is clearly unnecessary.

However, in the depicted process, the nickel hydroxide particles are coated with cobalt hydroxide by contact with, e.g., cobalt sulfate and sodium hydroxide at about 60° C. and a pH of about 10-10.5. In a specific embodiment, the cobalt hydroxide coated nickel hydroxide is treated with a concentrated alkaline solution (e.g., about 10~20 wt % sodium hydroxide at a temperature of 100° C.). See block 205. The alkaline treatment of the cobalt hydroxide layer appears to increase the cohesion between the cobalt hydroxide and nickel hydroxide. In the depicted embodiment, this treatment is followed by the addition of an alkali metal hydroxide solution, and a strong oxidizing reagent (see block 207). The resulting mixture of nickel hydroxide particles and oxidizing agent is treated under aggressive conditions (e.g., at an elevated temperature for a period of time such as at 100-130 C for 5 minutes to three hours). See block 209.

The reactants (the hydroxide, the oxidizing agent, and the nickel hydroxide) may be added in any order. As indicated, the nickel hydroxide particles may be uncoated or coated with cobalt or cobalt oxide. They may also contain some amount of nickel oxyhydroxide.

In a specific example, for demonstration purposes, the nickel hydroxide particles are coated with cobalt hydroxide and then aggressively oxidized according to the following process:

1. 1000 g Nickel hydroxide is added to a reaction vessel, together with 1500 g water.
2. 10~40 g of cobalt sulfate is dissolved in 140 g water
3. 3~11 g of sodium hydroxide is dissolved in 140 g water
4. The cobalt sulfate solution and sodium hydroxide solution are added to the reaction vessel, pH~10, temperature of 40-60° C., to form coated nickel hydroxide particles
5. 400 g 10 wt % sodium hydroxide aqueous solution is added and the temperature is increased to 90-100° C.
6. 50~150 g sodium persulfate is added to react with cobalt-coated nickel hydroxide at a temperature of 90-130° C.
7. The reaction mixture is maintained at 120° C. for 2 hrs
8. The resulting nickel hydroxide is washed and made ready for use in the nickel hydroxide paste In one example the above-described cobalt-coating process and the strong oxidizing process were conducted in a single container. 1000 g nickel hydroxide was put into a reaction vessel, together with 1500 g water. Then 20 g of cobalt sulfate was dissolved into 140 g water and 5.5 g sodium hydroxide was dissolved into 140 g water. The cobalt sulfate solution and sodium hydroxide solution were slowly added to the reaction vessel to maintain pH~10, temperature of 40-60° C. This is believed to produce cobalt hydroxide coated nickel hydroxide particles. Other cobalt salts besides cobalt sulfate may be used. Examples include cobalt nitrate, cobalt acetate and cobalt chloride. If the anion could have a detrimental effect on positive electrode performance, which may be the case with chloride for example, care should be taken to thoroughly wash the material prior to incorporation in the electrode.

After producing the cobalt hydroxide coated material, 400 g of 10 wt % sodium hydroxide aqueous solution was added into the vessel to reach a temperature of 90-100° C. Finally, 100 g sodium persulfate was added to be reacted with the cobalt-coated nickel hydroxide at a temperature of 120° C. for 2 hours. In general, a temperature of between about 90-130° C. may be used.

In one embodiment, nickel hydroxide or cobalt coated nickel hydroxide starting material is combined with concentrated hydroxide and stirred until the nickel hydroxide is in suspension. The container is then heated to about 100° C. or higher with occasional stirring. Then, sodium persulfate is slowly added to the heated mixture while the mixture is stirred. Stirring continues for some time, e.g., about 30 minutes. The mixture's pH may be monitored during the reaction. The stirring may continue periodically for some time, e.g., 1.5 hours.

After the oxidation reaction is complete, the mixture may be allowed to cool to room temperature and may be washed with water, e.g., distilled water, until the pH reaches about 8. During the washing, the container may be decanted a few times, e.g., 3-6 times. As much water as possible is then removed from the mixture without drying the mixture. The amount may be weighed and the total water content calculated. The amount of water calculated to be present in the treated mixture may then be reduced from the positive electrode paste recipe. The treated mixture is then used to create the active material paste for the positive electrode.

The process may be scaled as appropriate for high volume production of modified nickel hydroxide electrode material. In one embodiment, the cobalt hydroxide is applied using a diaphragm pump to transfer the sodium hydroxide and cobalt sulfate solutions into the reaction vessel. The reaction chamber may employ a pH meter to continuously monitor the alkalinity of the reaction solution and allow control of the pumping speed. The sodium persulfate can be added into the reaction vessel in solid or liquid condition. Those of skill in the art will appreciate that many variations are available for producing the nickel hydroxide starting material in volume.

Although the preceding example uses sodium persulfate, other strong oxidizing agents may be used. As mentioned, examples of such oxidizing agents include perchlorate salts, permanganate salts, ozone, and the like. Note that one benefit of the above process is that unwanted reaction products (e.g., sodium sulfate) are in solution and may be washed away. The separation process is easily monitored by checking the pH, which decreases as the reaction progresses. Thus an oxidizing agent that forms a precipitating reaction product would be undesirable, because separating the nickel hydroxide from the reaction product would be difficult. The relative amounts of materials may be adjusted up or down based on the material selected and the total desired product quantity. The stirring times in the examples above are illustrations only and do not limit how this process may be practiced. More or less stirring and other agitating methods may be used. Additionally, the treated nickel hydroxide obtained at the end of process may be wet or dry. For manufacturing purposes, the wet product incorporates into an active material paste easily, but dry, treated nickel hydroxide may be used for the active material paste if available in non-agglomerated form.

Aggressively treating nickel hydroxide particles at high temperature (e.g., about 120° C.) as described herein is believed to produce a modified structure at the surface of the nickel hydroxide that slows down migration of cobalt and zinc into the alkaline electrolyte at higher temperature sometime during the operation of the cell.

The interaction of nickel hydroxide with an alkali metal hydroxide solution renders the surface of the nickel hydroxide or cobalt-coated nickel hydroxide particles alkaline. The alkali metal hydroxide may be, for example, sodium, potassium or lithium hydroxide in an aqueous solution. Thus, the surface of the nickel hydroxide particles may incorporate potassium, sodium or lithium alkali metals. The strong oxidizing reagent is then added while maintaining the temperature between about 100 and 150 degrees Centigrade. The oxidizing reagent may be, for example, a persulfate salt, a perchlorate salt, a permanganate salt, ozone, and the like. The salts are typically, though not necessarily, sodium or potassium salts. Typical concentrations for the mixture are between about 5 wt % and 15 wt % sodium persulfate and between about 5 wt %~20 wt. % sodium hydroxide.

A typical reaction involving sodium persulfate and sodium hydroxide is shown by the following reactions:

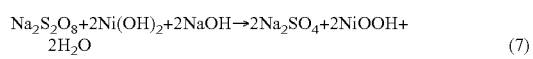

$$Na_2S_2O_8 + 2Ni(OH)_2 + 2NaOH \rightarrow 2Na_2SO_4 + 2NiOOH + 2H_2O \quad (7)$$

and

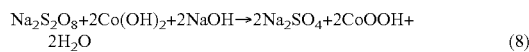

$$Na_2S_2O_8 + 2Co(OH)_2 + 2NaOH \rightarrow 2Na_2SO_4 + 2CoOOH + 2H_2O \quad (8)$$

Sodium persulfate and sodium hydroxide react with the cobalt on the nickel hydroxide or cobalt that is incorporated in the uncoated nickel hydroxide to form sodium sulfate and oxidized cobalt hydroxide or nickel hydroxide. It is believed that a cobalt coating on nickel hydroxide (or cobalt incorporated in a nickel hydroxide matrix) as provided by typical commercial sources has a valence of about 3. While not wishing to be bound by theory, it is believed that after treatment with a strong oxidizing agent such as sodium persulfate, the oxidation state of all cobalt or nickel in the nickel hydroxide increases to at least 3 and possibly more than 3. It is believed that the oxidation state after the treatment may become about 3 to 3.5, e.g., about 3.2 or about 3.0 rendering much of the cobalt as insoluble in alkaline media. Further, as explained above, it is believed that the aggressive oxidation of the surface of the nickel hydroxide particles produces a modified form of nickel hydroxide.

The Components of the Nickel Positive Electrode

The positive electrode includes an electrochemically active nickel oxide or hydroxide of the type described herein. In addition, it includes one or more additives to facilitate manufacturing, electron transport, wetting, mechanical properties, etc. For example, a positive electrode formulation may include the treated nickel hydroxide particles from the cobalt stabilization process described above, zinc oxide, cobalt oxide (CoO), cobalt metal, nickel metal, and a flow control agent such as carboxymethyl cellulose (CMC). Note that the metallic nickel and cobalt may be elemental metals or alloys. As explained, the oxidized nickel oxide particles and associated cobalt oxide or hydroxide may be formed on the same particle, e.g., through a co-precipitation process or by precipitating the cobalt onto nickel oxide particles. In certain embodiments, the positive electrode has a composition similar to that employed to fabricate the nickel electrode in a conventional nickel cadmium battery or a conventional nickel metal hydride battery.

Other materials may be provided with the positive electrode. Examples of materials that may improve charge efficiency include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). The addition of the yttrium oxide and the calcium compounds has been shown to be beneficial for the charge acceptance at higher temperatures See "Nickel Hydroxide Electrode: improvement of charge efficiency at high temperature" by K. Ohta, K. Hyashi, H Matsuda, Y. Yoyoguchi and Mikoma in The Electrochemical Society proceedings Volume 94-27 (Hydrogen and Metal Hydride Batteries edited by T. Sakai and P. D. Bennett), which is incorporated herein by reference for all purposes.

In certain embodiments, the finished positive electrode contains between about 0-10 weight percent cobalt metal powder, between about 0-10 weight percent of a cobalt compound such as cobalt oxide, cobalt hydroxide, or cobalt oxyhydroxide, between about 0-10 weight percent nickel powder, between about 0-3 weight percent zinc oxide, between 0-1 weight percent of an oxide and/or hydroxide of any of cadmium, yttrium, calcium, barium, strontium, scandium, lanthanide, bismuth, manganese, magnesium. In addition, the electrode may contain small amounts of a flow control agent such as carboxymethylcellulose (CMC) at a concentration of about 1 weight percent or less and/or a binder such as Teflon® (generally a fluorinated polyolefin such as PTFE) at a concentration of about 0.1-2 percent by weight. The balance of the positive electrode material will be modified nickel hydroxide (or other modified nickel compound) as described herein. In certain embodiments, the nickel hydroxide is present in an amount of about 60-95 weight percent.

In a specific example, the pasted nickel hydroxide electrode composition is made from about 4 weight % Co powder, about 10 weight % Ni210 powder together with about 0.4 weight % sodium carboxymethyl cellulose (CMC), and about 0.1~1 weight % poly(tetrafluoroethylene) (PTFE). Nickel hydroxide powder having an oxidized surface structure makes up the balance.

A few representative positive electrode compositions are described in the following documents, each of which is incorporated herein by reference: PCT Publication No. WO 02/039534 (by J. Phillips) (co-precipitated $Ni(OH)_2$, CoO and finely divided cobalt metal), US Patent Publication No. 2005-0003270 by J. Phillips filed Jul. 26, 2004, and US Patent Publication No. 20020192547 by J. Phillips filed Mar. 15, 2002 (fluoride additives), each of which are incorporated herein by reference.

The nickel hydroxide electrode is generally provided on a current conducting substrate such as a nickel foam matrix, although other substrate forms such as foils, perforated sheets, and expanded metals may also be used. In one example, the nickel foam is provided by Inco, Ltd. In certain embodiments, the foam substrate thickness may be between about 15 and 60 mils. In a specific embodiment, the thickness of the positive electrode, comprising nickel foam filled with the electrochemically active and other electrode materials, ranges from about 16 to 24 mils. In a particularly preferred embodiment, positive electrode is about 20 mils thick.

In a specific embodiment, nickel foam of density ranging from about 300-500 $g/m^2$ is used. An even more preferred range is between about 350-500 $g/m^2$. In a particularly preferred embodiment nickel foam of density of about 350 $g/m^2$ is used. As the width of the electrode layer is decreased, the foam may be made less dense to ensure there is sufficient void space. In a specific embodiment, a nickel foam density of about 350 $g/m^2$ and thickness ranging from about 16-18 mils is used.

Methods of making positive electrodes of this invention include wet and dry processes. Wet processes are described in U.S. patent application Ser. No. 10/921,062, filed Aug. 17, 2004, and incorporated herein by reference. For example, the pasted nickel hydroxide electrode may be made using a mixture of the stabilized nickel hydroxide powder of this invention, together with other positive electrode components (e.g., cobalt powder, nickel powder, CMC and PTFE) in a paste. The active material paste is forced into nickel foam and pressed to form a nickel electrode plate. In other embodiments, the positive electrode is made by a dry process which does not employ substantial water or other liquid. See for example U.S. patent application Ser. No. 11/367,028, filed Mar. 1, 2006 and incorporated herein by reference. The component materials of nickel hydroxide, nickel and cobalt powders are dry blended together with a suitable binder and are introduced into a hopper. A continuous strip of foam nickel is drawn through the powder while rotating brushes force material into the foam pores. A compression roller step sizes the foam to the appropriate porosity.

Nickel Battery and Battery Components

Figure 3B:
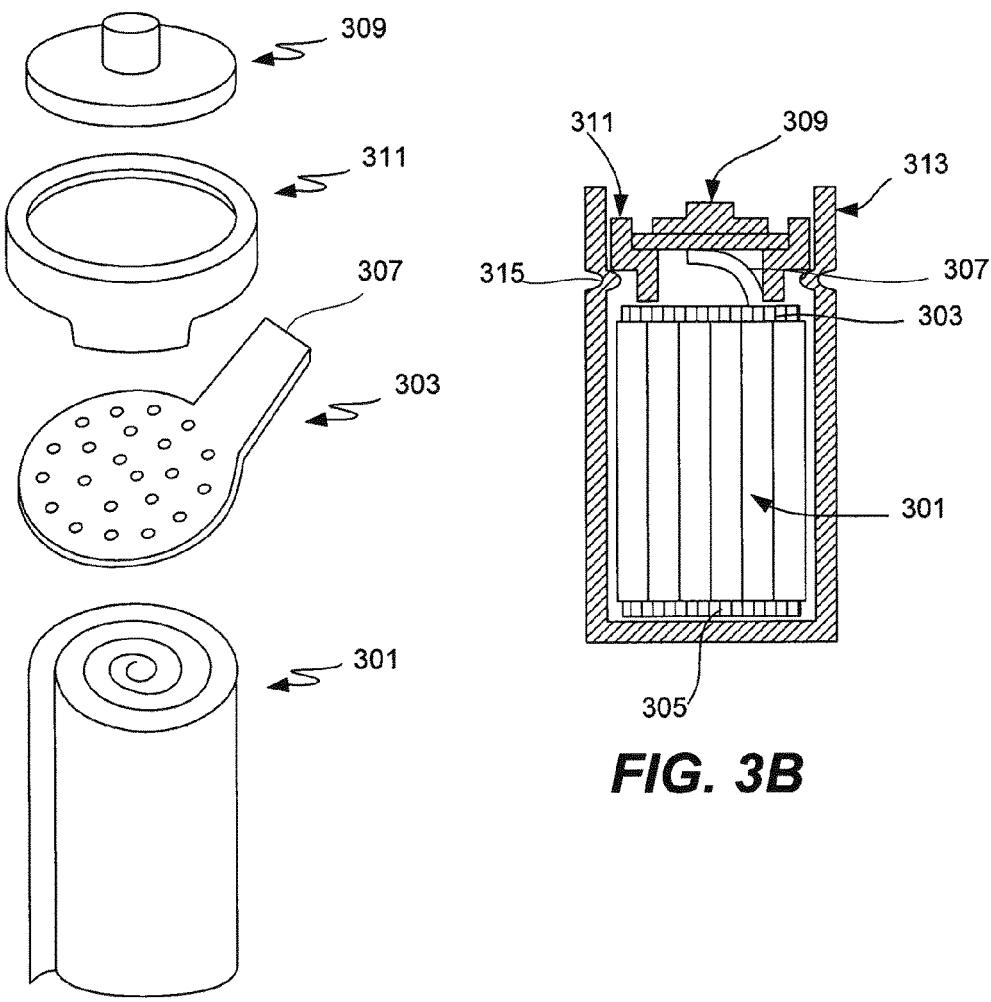
FIG. 3B is a diagrammatic cross-sectional view of an assembled nickel zinc battery cell suitable for practicing the present invention.
Figure 3A:
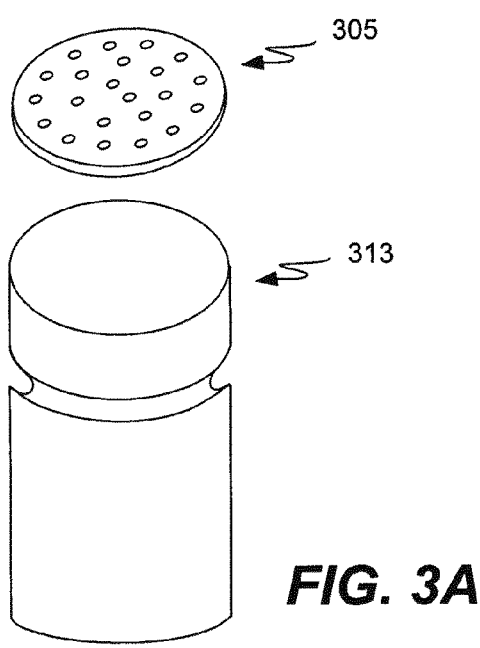
FIG. 3A is an exploded diagram of a nickel zinc battery cell suitable for practicing the present invention.

FIGS. 3A and 3B are graphical representations of the main components of a cylindrical power cell according to an embodiment of the invention, with FIG. 3A showing an exploded view of the cell. Alternating electrode and electrolyte layers are provided in a cylindrical assembly 301 (also called a "jellyroll"). The cylindrical assembly or jellyroll 301 is positioned inside a can 313 or other containment vessel. A negative collector disk 303 and a positive collector disk 305 are attached to opposite ends of cylindrical assembly 301. The negative and positive collector disks function as internal terminals, with the negative collector disk electrically connected to the negative electrode and the positive collector disk electrically connected to the positive electrode. A cap 309 and the can 313 serve as external terminals. In the depicted embodiment, negative collector disk 303 includes a tab 307 for connecting the negative collector disk 303 to cap 309. Positive collector disk 305 is welded or otherwise electrically connected to can 313. In other embodiments, the negative collector disk connects to the can and the positive collector disk connects to the cap.

The negative and positive collector disks 303 and 305 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 311 rests on a circumferential bead 315 provided along the perimeter in the upper portion of can 313, proximate to the cap 309. The gasket 311 serves to electrically isolate cap 309 from can 313. In certain embodiments, the bead 315 on which gasket 311 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 3B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, a nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116, 113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel-zinc battery cells of this invention and appropriate casing, contacts, and conductive lines to permit charge and discharge in an electric device.

Note that the embodiment shown in FIGS. 3A and 3B has a polarity reverse of that in a conventional nickel-cadmium cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a certain embodiments of this invention, including that depicted in FIGS. 3A and 3B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

The can is the vessel serving as the outer housing or casing of the final cell. In conventional cells, where the can is the negative terminal, it is typically nickel-plated steel. As indicated, in this invention the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Some details of the structure of a vent cap and disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes and Separator Structure

Figure 4:
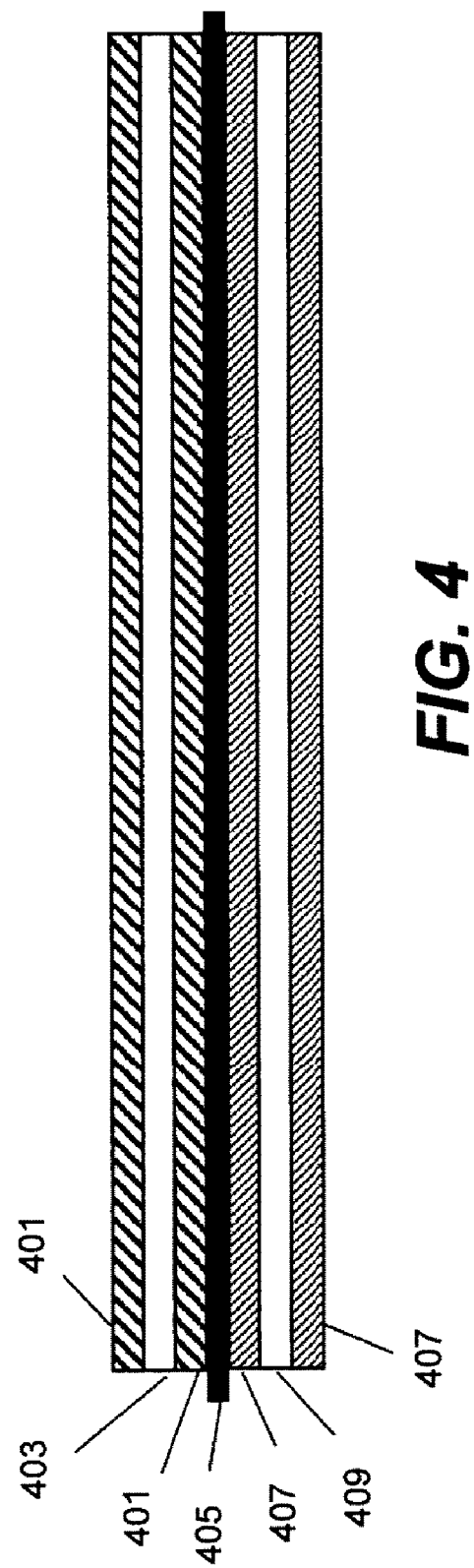
FIG. 4 illustrates the various layers in the negative electrode-separator-positive electrode sandwich structure in accordance with an embodiment of the present invention.

FIG. 4 illustrates layers in the negative electrode-separator-positive electrode sandwich structure which may be used in a jellyroll or prismatic cell structure. The separator 405 mechanically and electrically separates the negative electrode (components 401 and 403) from the positive electrode (components 407 and 409) while allowing ionic current to flow between the electrodes. The negative electrode includes electrochemically active layers 401 and an electrode substrate 403. The electrochemically active layers 401 of the zinc negative electrode typically include zinc oxide and/or zinc metal as the electrochemically active material. The layer 401 may also include other additives or electrochemically active compounds such as calcium zincate, bismuth oxide, aluminum oxide, indium oxide, hydroxyethyl cellulose, and a dispersant.

The electrode substrate 403 should be electrochemically compatible with the negative electrode materials 401. As described above, the electrode substrate may have the structure of a perforated metal sheet, an expanded metal, a metal foam, or a patterned continuous metal sheet.

Opposite from the negative electrode on the other side of the separator 405 is the positive electrode. The positive electrode also includes electrochemically active layers 407 and an electrode substrate 409. The layers 407 of the positive electrode may include nickel hydroxide, nickel oxide, and/or nickel oxyhydroxide as electrochemically active materials and various additives, all of which are described above. The electrode substrate 409 may be, for example, a nickel metal foam matrix or nickel metal sheets. Note that if a nickel foam matrix is used, then layers 907 would form one continuous electrode.

The Negative Electrode

As applied to nickel-zinc cells, the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may comprise one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide.

If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

Considering electrochemically active zinc components in particular (and other particulate electrode components as well), such components preferably have a particle size that is no greater than about 40 or 50 micrometers. In certain embodiments, the material may be characterized as having no more than about 1% of its particles with a principal dimension (e.g., diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps may be taken to preserve battery components, including the negative electrode, in their chemically useful form. When electrode materials corrode or otherwise degrade to a significant extent over weeks or months without use, their value becomes limited by short shelf life.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc. Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxyethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

The Separator

Typically, a separator will have small pores. In certain embodiments the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a certain embodiments, the separator comprises at least two layers (and preferably exactly two layers)—a barrier layer to block zinc penetration and a wetting layer to keep the cell wet with electrolyte, allowing ionic current to flow. This is generally not the case with nickel cadmium cells, which employ only a single separator material between adjacent electrode layers.

Performance of the cell may be aided by keeping the positive electrode wet and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

Another consideration in the electrode/separator design is whether to provide the separator as simple sheets of approximately the same width as the electrode and current collector sheet or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The Electrolyte

In certain embodiments pertaining to nickel-zinc cells, the electrolyte composition limits dendrite formation and other forms of material redistribution in the zinc electrode. Examples of suitable electrolytes are described in U.S. Pat. No. 5,215,836 issued to M. Eisenberg on Jun. 1, 1993, which is hereby incorporated by reference. In some cases, the electrolyte includes (1) an alkali or earth alkali hydroxide, (2) a soluble alkali or earth alkali fluoride, and (3) a borate, arsenate, and/or phosphate salt (e.g., potassium borate, potassium metaborate, sodium borate, sodium metaborate, and/or a sodium or potassium phosphate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

In some cases, the electrolyte may contain a relatively high concentration of phosphate ion as discussed in U.S. patent application Ser. No. 11/346,861, filed Feb. 1, 2006 and incorporated herein by reference for all purposes.

Performance of the Nickel Electrode and Batteries

Battery cells employing the nickel electrodes containing modified nickel hydroxide (or other nickel compound) particles with modified surfaces as described herein provide excellent performance in multiple areas. For example, they provide long cycle life when used in high rate applications such as power tools, lawn and gardening tools, and electric vehicles (including hybrid electric vehicles). In certain embodiments, the cells provide at least about 250 cycles of useful service when operated at consistently high rates (e.g., at least about 5 C discharge rate and at least about 1 C charge rate). In some cases, they provide at least about 500 cycles (and even up to 700 or more cycles) of useful service at under the same high rate conditions. Useful service means that on average the positive electrode is utilized at a level of greater than about 250 mAh/gram (or in some embodiments greater than about 295 mAh/gram) active material.

In addition, the positive electrodes themselves possess very high charge efficiencies even when operated at very high charging rates. For example, in certain embodiments, the positive electrodes have a charge efficiency of at least about 90%, or even 99% or higher, when charged at a rate of 5 C or greater.

In addition the positive electrodes exhibit very little swelling during cycling, which is a dramatic improvement over unmodified nickel hydroxide positive electrodes. A comparative example is provided in FIG. 9, which is described below. In some cases, the positive electrodes exhibit less than about 10% size increase during cycling over 100 cycles, and in some embodiments, less than about 15% size increase during cycling, even after at least about 300 cycles. The swelling may be measured by an increase in the thickness of the positive electrode. The mechanical stability achieved with this reduced swelling likely reduces the capacity fade normally exhibited in cells with increasing cycle number.

EXPERIMENTAL

Commercially available nickel hydroxide particles, which were supplied by the Changsha Research Institute and Kelong of China, were coated with cobalt hydroxide and the oxidized-treatment of the nickel hydroxide particles are according to the processes described above (cobalt sulfate and sodium hydroxide solution at 60° C. and pH of 10-10.5) to produce a surface layer of cobalt oxyhydroxide on the nickel hydroxide particles. The cobalt oxyhydroxide layer at the surface of nickel hydroxide was about 0.5 wt. % of the nickel hydroxide particles. The lattice structure of nickel hydroxide with the attached CoOOH lattice, was aggressively oxidized as described herein to inhibit the escape of the cobalt and zinc within the lattice of nickel hydroxide particle into the alkaline electrolyte of the cell. The nickel hydroxide particles contained (prior to coating) approximately 3.5 weight % zinc and 2 weight % cobalt in lattice.

Each of 5 grams regular nickel hydroxide powder and the oxidation-treated nickel hydroxide powder were placed into 10 grams of 30 weight % potassium hydroxide solution at 60° C. Table 1 shows the quantity of cobalt and zinc leached from the crystal lattice after storage for 4 days at 60° C.

TABLE 1

Cobalt and Zinc Concentrations Measured after 4 days at 60° C. in 30% KOH (5 g nickel hydroxide)

| | Cobalt Amount in 30 wt. % KOH at 60° C. (ppm) | Zinc Amount in 30 wt. % KOH at 60° C. (ppm) |
|---|---|---|
| Regular nickel hydroxide | 2.90 | 13.5 |
| Treated Nickel hydroxide | 2.51 | 11.2 |

Certain advantages of this invention were demonstrated with sealed spiral Sub-C format nickel-zinc cells. The positive electrode, separator, and negative electrode were wound and inserted into the battery can before electrolyte filling. The positive electrode was connected to the battery can. The negative electrode was connected to the battery vent cap. Finally, after electrolyte addition, the cap was crimp sealed to the battery. The separator was 0.10-0.30 mm non-woven Nylon, in combination with a membrane of wettable Polypropylene (PP), or Polyethylene (PE). A formation cycle was then applied.

The positive electrode is described as follows.
(1) The substrate of positive electrode uses the nickel foam. The thickness of the nickel foam was pre-calendared to be 0.77 mm.
(2) A mixture of spherical nickel hydroxide particles and conductive additives was used to form the paste for the positive electrode. The mixture of the positive paste contains 4 weight % Co powder, 10 weight % Ni 210 powder, 0.4 weight % CMC and 0.2 weight % PTFE. Nickel hydroxide powder made up the balance.
(3) The pasted mixture was well pasted into the nickel foam. A drying temperature of 100° C. was used. A roller-press was used to calendar the nickel electrode to 0.42 mm~0.43 mm.
(4) The nickel electrode plate was cut to be 33.5 mm in width and 265 mm in length.

The negative electrode is described as follows.
(1) The conductive substrate for the negative electrode was a punched tin-plated copper strip of thickness 0.1 mm.
(2) The zinc metal and zinc oxide powder were mixed with other negative additives. The zinc metal alloy powder contains indium and bismuth which act as the anti-corrosive agents. The additives for the negative paste includes the ZnO, $Ca(OH)_2$, $Bi_2O_3$, $Al_2O_3$, and indium oxide or indium sulfate. The zinc metal powder in the mixture made up 10%-15% by weight percent. The zinc oxide powder in the mixture made up 75~80 weight %. The other additives in the negative electrode mixture made up 5%-10% by weight.
(3) The binding materials were CMC and PTFE.
(4) The paste mixture was pasted onto the tin-plated copper substrate. The drying temperature was 60° C.
(5) The negative electrode was also baked at 250~300° C. to remove the organic materials.
(6) The negative electrode was calendared in a roller-press to form 0.32 mm in thickness.

The electrolyte components were 760 g $H_2O$, 1220 g 45% potassium hydroxide solution, 84.7 g sodium phosphate ($Na_3PO_4.12H_2O$), 59 g sodium hydroxide, 16.8 g lithium hydroxide, and 3.2 g zinc oxide (ZnO).

As explained, the observed cell performance benefits included higher charge efficiency, higher delivered Amp hour capacity, lower self discharge, lower hydrogen gassing, lower impedance, improved battery cycle, service life, and cell-to-cell uniformity.

For comparison purposes different types of battery cells were made using nickel positive electrodes made with or without the oxidation treatment described herein. After the cells were constructed and formed (formation cycles completed), the cells were subjected to various tests. All of the cells had a capacity of 1.90 Ah at 10 A and 30 A discharge currents. All of the cells had identical electrolyte and zinc negative electrode compositions and were made using the same recipe and process. The "soak" time of these cells before formation was 1 hour. The electrolyte soak time is time between the filling of the cells with electrolyte and the application of the first charging current. The cobalt-coated nickel hydroxide contained about 1% cobalt on the surface of the nickel hydroxide particles.

Cell A was made as follows. Untreated regular nickel hydroxide was used as the positive active material. The positive electrode was pasted using 4 weight % cobalt powder, 9 weight % nickel powder, 0.4 weight % CMC and 0.2 weight % PTFE.

Cell B was made as follows. The nickel hydroxide powder was treated using persulfate in alkaline solution at 120° C. while mixing time for 2 hours. Both the concentration of the sodium hydroxide and sodium persulfate were 15% by weight. The positive electrode was pasted using 4 weight % cobalt powder, 9 weight % nickel powder, 0.4 weight % CMC and 0.2 weight % PTFE. The "soak" time was 1 hour.

Figure 5:
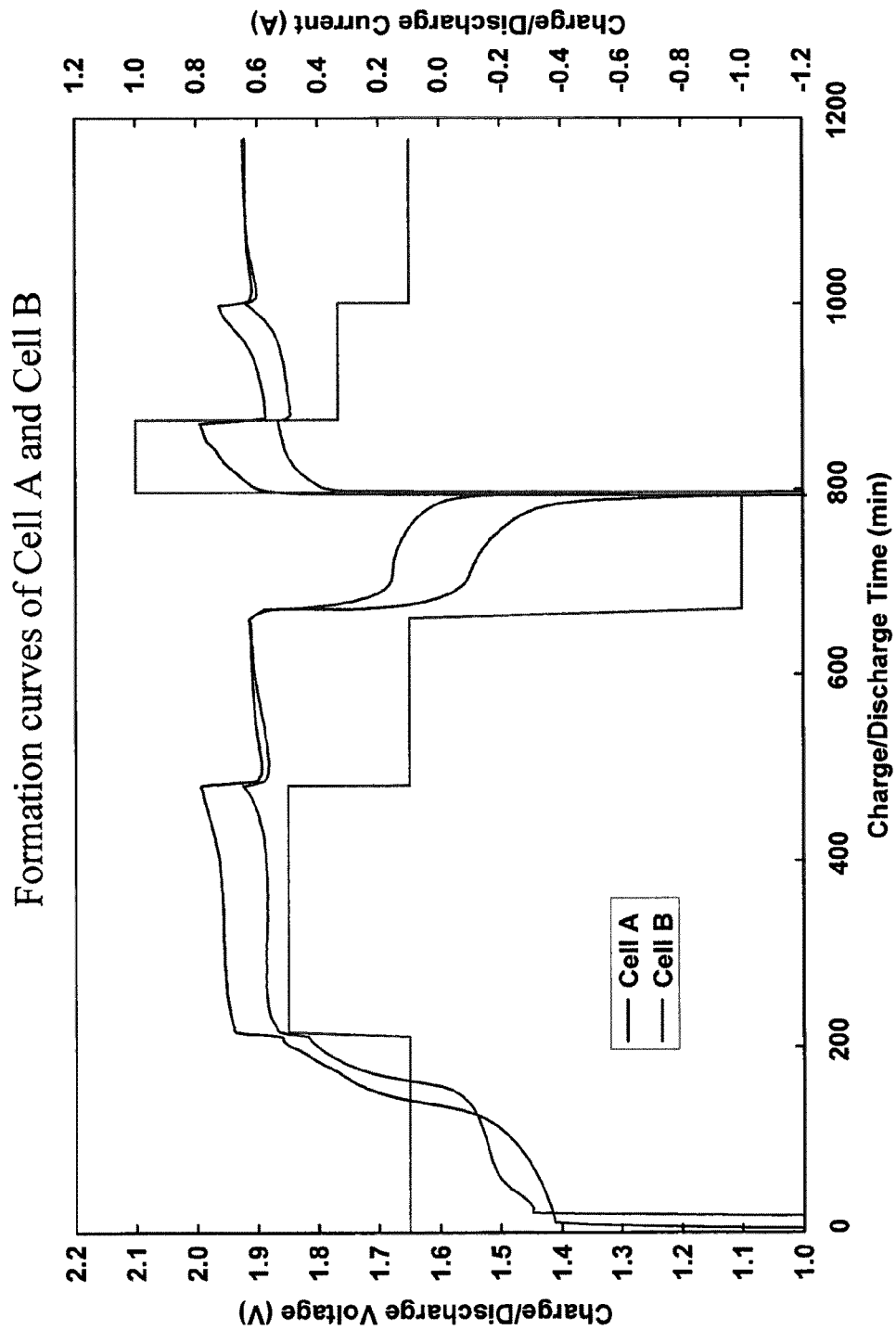
FIG. 5 is a formation curve for cells prepared with and without nickel hydroxide oxidized as described herein.

The formation of all cells listed above was carried out as shown in FIG. 5. As mentioned, formation of cells refers to the initial electrical charging. The charge voltage response for Cell A and Cell B is also shown in FIG. 5. As is clearly shown, the charge voltage curve of the battery using the oxidization-treated nickel hydroxide is similar to that of the battery using regular nickel hydroxide electrode. It is indicated that the valence of the nickel hydroxide is not increased during the oxidization treatment. The major change is that the performance of the nickel hydroxide particles is improved. It is believed that the surface treatment enables the added-cobalt powder in the pasted electrode to encapsulate the nickel hydroxide particles and inhibits the dissolved-cobalt compounds from migrating into the negative electrode. The improvement of the nickel surface activity benefits the high-rate charge/discharge capability of the nickel hydroxide electrode. Note that in the first about 100-300 minutes, the curve includes a shoulder, where the increase in voltage slows down. After passing this shoulder (sometimes referred to as a "cobalt wave"), the voltage increases rapidly to about 1.85 V. This "shoulder" represents the oxidation of cobalt II to cobalt III. After all the cobalt II is converted to cobalt III, the main electrochemical reaction, i.e., that of equation (1) above, resumes.

Figure 6:
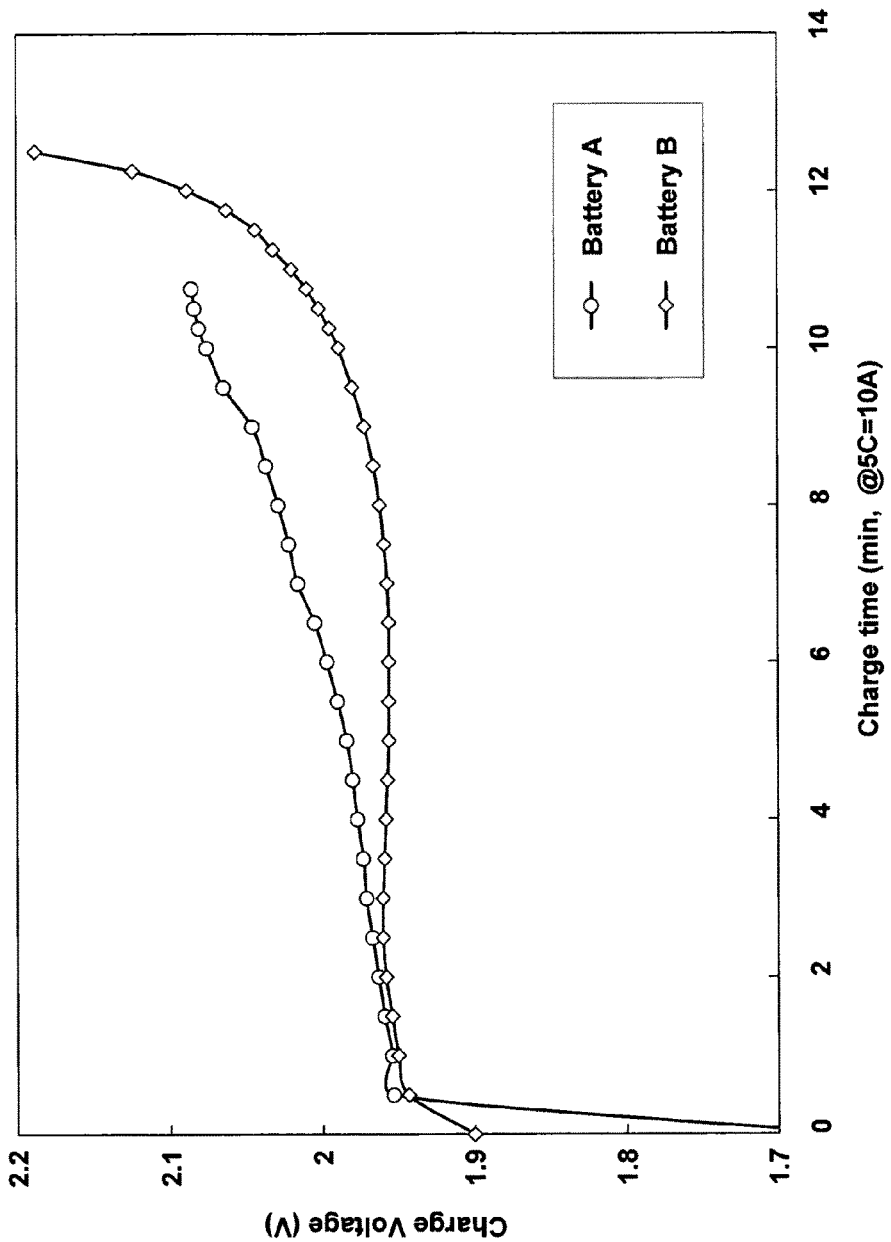
FIG. 6 is a charge plot for the cells of FIG. 5.

In the experiments described in this section, Cells A and B were charged at a 10 A (5.3 C charge rate). The charge curves are shown in FIG. 6. Cell A, which employs untreated nickel hydroxide, shows that the charge voltage quickly increases with increasing time. After the state of charge is about 50%, the charge acceptance decreases because of the oxygen evolution. The oxygen evolution leads to an increase in the battery over-potential and then the charge acceptance decreases with increasing charge time. In contrast, the cell employing the oxidation-treated nickel hydroxide (Cell B) shows the higher charge efficiency. After the state of charge is over 90%, the charge voltage starts to increase with increasing charge time. This means that the oxygen evolution begins only after the electrode reaches about 90% state of charge. The high charge acceptance at the high-rate charge current may provide an important benefit for hybrid electric vehicle (HEV) applications.

Figure 7:
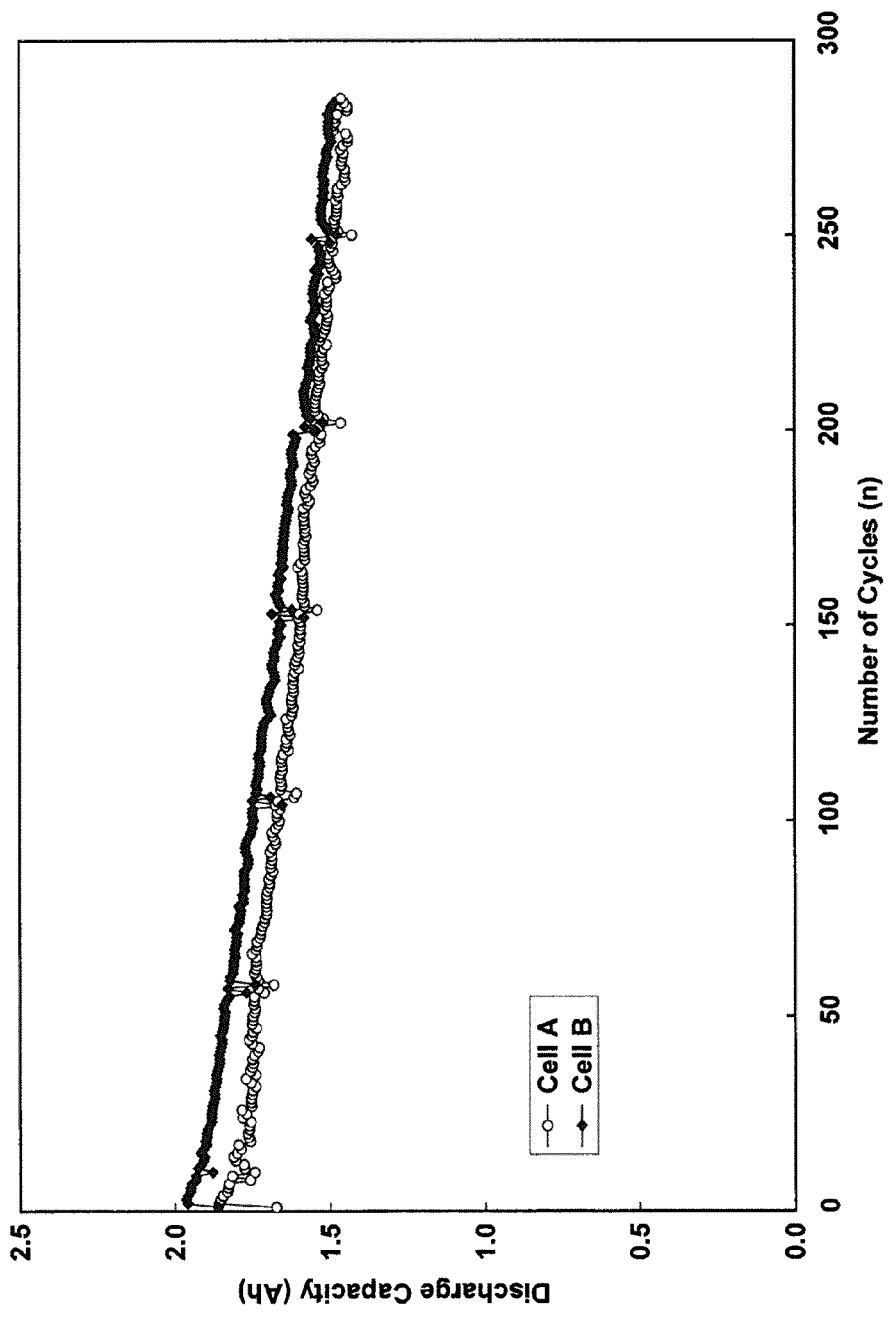
FIG. 7 is a plot showing discharge capacity for the cells of FIG. 5 when discharged at 10 A.
Figure 8:
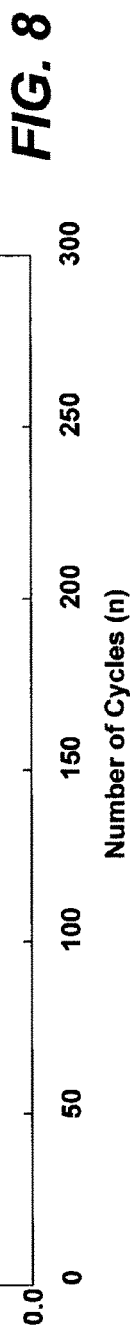
FIG. 8 is a plot showing discharge capacity for the cells of FIG. 5 when discharged at 30 A.

The batteries were cycled at a charge regime with 2 A constant current charge to 1.90V and constant voltage charge to 90 mA end-of-charge current. The discharge current was 10 A. The temporary capacity dips appearing in the cycling curves correspond to 20 A discharge cycles followed by 24 hours rest at the $10^{th}$ cycle and then resuming continuous cycling but resting at every $50^{th}$ cycle. The discharge capacities of the cells are shown in FIG. 7. These cells were also discharged at 30 A discharge current. The discharge capacities for 30 A discharge are shown as function of cycle number in FIG. 8. As can be seen, the capacity of Cell B has a small degradation with increasing the number of cycles. It is noteworthy that Cell B shows particularly better performance (in comparison to Cell A) at 30 A discharge current (15.8 C discharge rate).

Figure 9:
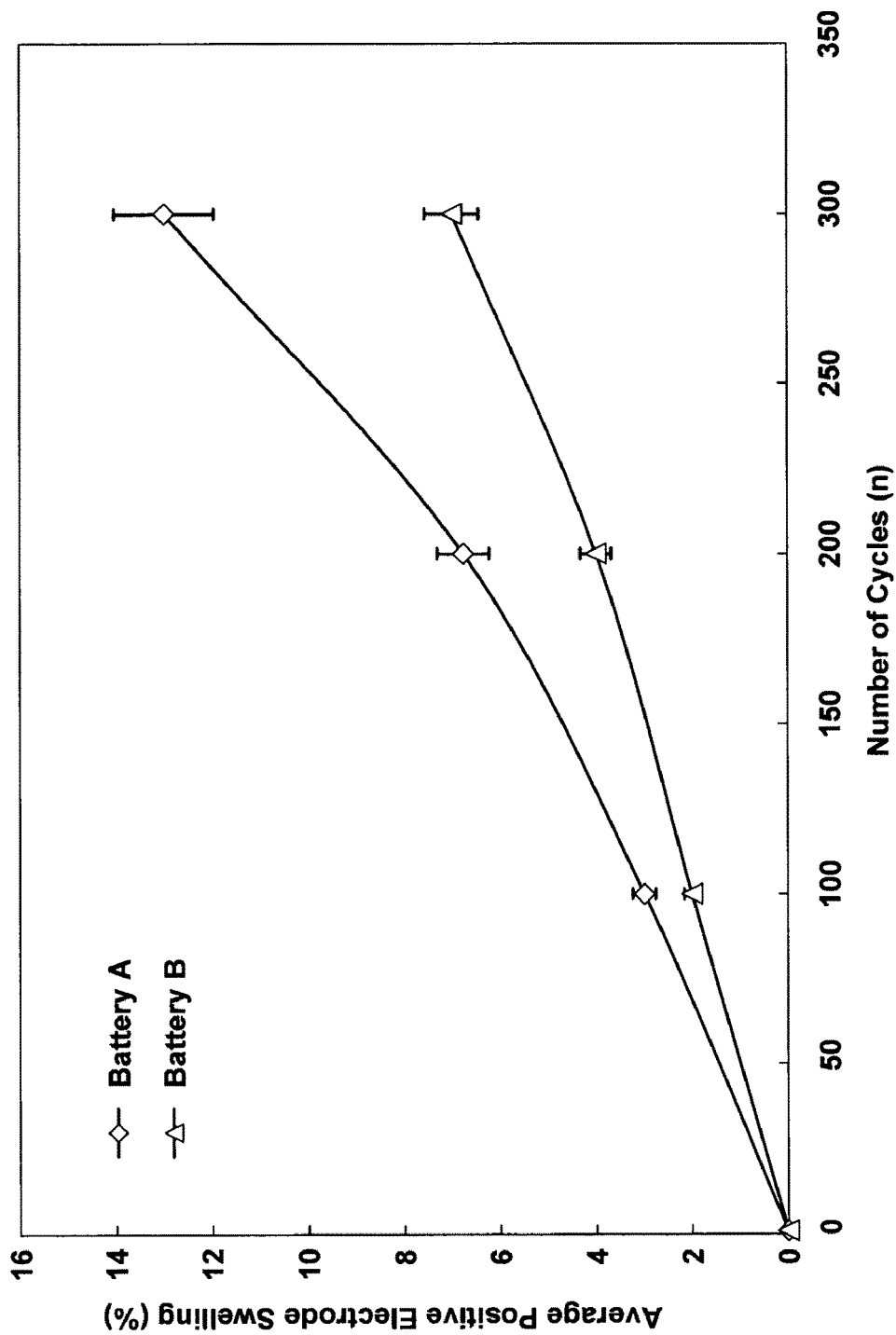
FIG. 9 is a graph showing the swelling of the positive electrode as a function of cell cycle.

The thickness of the nickel hydroxide electrode increases with each discharge and then shrinks during the subsequent charge. The expansion and shrinkage resulting from discharge and charge are reversible, usually less than 5% in a magnitude. However, there is another type of swelling that is irreversible and results in a gradual, and usually continual, expansion of the positive electrode over many cycles. This irreversible swelling introduces various detrimental effects and should be minimized. As illustrated by the data presented in FIG. 9, the swelling typically increases with increasing numbers of cycles. However, the treated nickel hydroxide electrode shows relatively little swelling with increasing cycle numbers in comparison with the untreated nickel hydroxide electrode. FIG. 9 shows the irreversible positive electrode swelling as a function of the cycling numbers. As fabricated, the nickel hydroxide electrodes used in this example were about 0.42 mm thick. When the batteries were formed, the electrode thickness swelled by about 5~10%. The data shown in FIG. 9 was based on the electrode thicknesses after formation but prior to formal cycling. However, it should be noted that during formation, the thickness of the untreated electrode swelled by approximately 12% while the treated electrode swelled by only approximately 5%. The electrode thickness was measured in the discharged state.

In general, the oxygen generation in the positive electrode during over-charge accelerates the swelling of the pasted nickel electrode. Because the oxidation treatment of the nickel hydroxide improves the charge acceptance of the nickel electrode, it is believed to minimize oxygen evolution.

CONCLUSION

Although various details have been omitted for clarity's sake, various design alternatives may be implemented. Therefore, the present examples are to be considered as illustrative and not restrictive, and the invention is not to be limited to the details given herein, but may be modified within the scope of the invention.

What is claimed is:

1. A galvanic cell comprising:
   (a) a zinc oxide based negative electrode;
   (b) a nickel hydroxide positive electrode comprising:
      nickel hydroxide particles having a modified surface comprising nickel in a higher oxidation state on average than is present in the bulk of the particles and
      a coating of a cobalt compound on the nickel hydroxide particles, said coating also comprising added cobalt metal;
   (c) a separator disposed between the positive electrode and the negative electrode and preventing electrical contact therebetween; and
   (d) an alkaline electrolyte in contact with the negative electrode, the positive electrode and the separator;
   wherein the cobalt content, including added cobalt metal and the cobalt compound, in the nickel hydroxide positive electrode is not significantly soluble in the alkaline electrolyte at room temperature and the coating of the cobalt compound on the surface of the nickel hydroxide particles is between about 0.1% and 1% by weight of the coated nickel hydroxide particles.

2. The cell of claim 1, wherein the cobalt compound is selected from the group consisting of cobalt oxide, cobalt hydroxide, cobalt oxyhydroxide, and combinations thereof.

3. The cell of claim 1, wherein the cell achieves a cycle life of at least about 500 cycles at a discharge rates of about 5 C or greater.

4. The cell of claim 1, wherein the zinc oxide based negative electrode comprises no more than about 10 ppm cobalt.

5. The cell of claim 1, wherein the nickel hydroxide positive electrode further comprises nickel metal powder, $Y_2O_3$, $Ca(OH)_2$, and a binder.

6. The cell of claim 1, wherein the nickel hydroxide particles comprise a coating of a cobalt compound and wherein at least about 90% by weight of the cobalt compound in the coating has a valence of 3 to 3.25.

* * * * *